US007085589B1

(12) United States Patent
Tezuka

(10) Patent No.: US 7,085,589 B1
(45) Date of Patent: Aug. 1, 2006

(54) MULTIFUNCTION TELEPHONE AND MULTIFUNCTION TELEPHONE SWITCHING SYSTEM USING THE SAME

(75) Inventor: Asumaru Tezuka, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 757 days.

(21) Appl. No.: 09/707,963

(22) Filed: Nov. 8, 2000

(30) Foreign Application Priority Data

Nov. 9, 1999 (JP) ................................. 11-318150

(51) Int. Cl.
*H04M 1/00* (2006.01)
(52) U.S. Cl. .................................... 455/556.1; 455/557
(58) Field of Classification Search ............. 455/554.1, 455/555, 556.1, 557, 567, 74.1, 414.1, 417
See application file for complete search history.

(56) References Cited

U.S. PATENT DOCUMENTS

| | | | | |
|---|---|---|---|---|
| 4,752,949 A | * | 6/1988 | Steinbeck et al. | 455/74.1 |
| 4,860,335 A | * | 8/1989 | Namekawa | 455/404.1 |
| 5,555,448 A | * | 9/1996 | Thiede et al. | 455/74.1 |
| 5,841,854 A | | 11/1998 | Schumacher et al. | |
| 5,903,835 A | * | 5/1999 | Dent | 455/427 |
| 5,978,667 A | * | 11/1999 | Suzuki et al. | 455/403 |
| 6,026,295 A | * | 2/2000 | Okada | 455/416 |
| 6,073,031 A | * | 6/2000 | Helstab et al. | 455/557 |
| 6,125,277 A | * | 9/2000 | Tanaka | 455/436 |
| 6,125,285 A | * | 9/2000 | Chavez et al. | 455/557 |
| 6,314,298 B1 | * | 11/2001 | Hiroki | 455/465 |
| 6,314,303 B1 | * | 11/2001 | Phipps | 455/555 |
| 6,343,220 B1 | * | 1/2002 | Van Der Salm | 455/552.1 |
| 6,366,784 B1 | * | 4/2002 | Hsueh | 455/462 |
| 6,466,799 B1 | * | 10/2002 | Torrey et al. | 455/462 |
| 6,574,489 B1 | * | 6/2003 | Uriya | 455/567 |
| 6,643,523 B1 | * | 11/2003 | Goetz | 455/557 |
| 6,804,536 B1 | * | 10/2004 | Bultman | 455/557 |

FOREIGN PATENT DOCUMENTS

| | | |
|---|---|---|
| JP | H08-251641 A | 9/1996 |
| JP | 9-205492 A | 8/1997 |
| JP | 2776066 | 5/1998 |
| JP | 10-155167 | 6/1998 |
| JP | H10-173744 | 6/1998 |
| JP | 10-191420 | 7/1998 |
| JP | H11-55363 | 2/1999 |
| JP | H11-122375 | 4/1999 |
| JP | 11-136714 | 5/1999 |

* cited by examiner

*Primary Examiner*—Jean Gelin
*Assistant Examiner*—Sam Bhattacharya
(74) *Attorney, Agent, or Firm*—Sughrue Mion, PLLC

(57) ABSTRACT

A multifunction telephone switching system includes a portable radiophone, a plurality of multifunction telephones, a specific one of which is connected to the portable radiophone, and a control unit connected to the plurality of multifunction telephones to manage the plurality of multifunction telephones. The specific multifunction telephone notifies a call arrival at the portable radiophone to the control unit. The control unit permits response to an arrived call for the specific multifunction telephone based on an operation state of the specific multifunction telephone. The specific multifunction telephone responds to the arrived call at the portable radiophone in response to the permission.

28 Claims, 12 Drawing Sheets

MULTIFUNCTION TELEPHONE AND MULTIFUNCTION TELEPHONE SWITCHING SYSTEM USING THE SAME

BACKGROUND OF THE INVENTION

1. Field of the Invention

The present invention relates to a multifunction telephone through which communication with a portable phone is possible, and a multifunction telephone switching system for accommodating a multifunction telephone.

2. Description of the Related Art

A private network in an office is composed of a plurality of private telephones. The plurality of private telephones are accommodated in a private automatic branch exchange (PBX). The private network may be composed of a switching control system which executes the same processing as the private branch exchange. The switching control system is connected directly or via the private automatic branch exchange, with external lines such as public lines, private lines, telecommunication company lines, and WAN lines. The switching control system is composed of a control unit, which controls the plurality of private telephones, and a line unit which connects the control unit with the private branch exchange or the external line. The control unit may directly connect the plurality of private telephones managed or controlled by the control unit with the external line. The control unit can control extension line communication between the plurality of private telephones controlled by the control unit. The control unit can control extension line communication between the plurality of private telephones controlled by the control unit and the plurality of private telephones controlled by the private branch exchange. The control unit can provide additional services such as message service, interphone service, and data reference service. The private telephone which can receive addition services is called a multifunction telephone. The private network which is composed of the exchange control system and the plurality of multifunction telephones is called a multifunction telephone switching system.

FIG. 1 shows the structure of the conventional multifunction telephone switching system. The conventional multifunction telephone switching system 2 shown in FIG. 1 is composed of a public line network (Public Switch Telephone Network: PSTN) 101, a private branch exchange (PBX) 102, a line unit 103, a control unit 104 and a multifunction telephone 105. The public line network 101 is not limited to PSTN and may be other line networks such as a private line network.

The private branch exchange 102 is connected to the public line network 101, private lines (not shown) and the line unit 103. The line unit 103 is connected to the control unit 104, the public line network 101, the private branch exchange 102, a LAN (Local Area Network) (not shown) and a computer (not shown). The line unit 103 is a control unit which is composed in software and hardware. The line unit 103 carries out protocol conversion. The protocol conversion carried out by the line unit 103 is voltage conversion and/or format conversion of a signal. The control unit 104 accommodates the multifunction telephones of a predetermined number. The control unit 104 is a control unit which is composed in software and hardware. The control unit 104 is installed for every floor of a building or every building in a factory site.

The control unit 104 is composed of a line control section 111, a line switching control section 112, a multifunction telephone control section 113, a data storage section 114, and a sound source 115. The line control section 111 is connected with the line unit 103, the line switching control section 112, and the sound source 115. The line switching control section 112 is connected with the multifunction telephone control section 113 and the data storage section 114. The multifunction telephone control section 113 is connected with the sound source 115.

The line control section 111 carries out the protocol conversion of a signal which is transferred between the line switching control section 112 and the line unit 103. The line control section 111 is a control section which is composed of software and hardware. The protocol conversion is voltage conversion and/or format conversion of the signal.

The line switching control section 112 carries out the operation control of the plurality of multifunction telephones 105 which are accommodated in the control unit 104. The line switching control section 112 is a control section which is composed of software and hardware.

The multifunction telephone control section 113 carries out the protocol conversion of a signal which is transferred between the line switching control section 112 and the multifunction telephone 105. The multifunction telephone control section 113 is a control section which is composed of software and hardware. The protocol conversion carried out by the multifunction telephone control section 113 is voltage conversion and/or format conversion of the signal.

The data storage section 114 stores the operation data showing the operation state of each of the plurality of the multifunction telephones 105 which are accommodated in the control unit 104. The data storage section 114 is a rewritable non-volatile memory or a hard desk unit.

The sound source 115 generates an acoustic signal of an equipment (not shown) which is connected through the line unit 103, a warning sound and a suspension sound to be reproduced by the multifunction telephone 105. The sound source 115 is composed of software and hardware.

The multifunction telephone 105 is connected with the multifunction telephone control section 113 of the control unit 104. The plurality of the multifunction telephones (not shown) may be connected with the multifunction telephone control section 113. The multifunction telephone 105 carries out extension line communication with another multifunction telephone. The multifunction telephone 105 carries out external line communication with another telephone which is connected through the public line network 101.

FIG. 2 shows the top outward appearance of the conventional multifunction telephone. The multifunction telephone 105 is composed of a handset 121, a display unit 122 and a group of buttons 123. The button group 123 is composed of numeric keys 131, a function setting button group 132, and a suspension button 133, a response button 134 and a monitor button 135.

The handset 121 is composed of a speaker and a microphone. The display unit 122 is composed of a liquid crystal display. The numeric keys 131 are used for input of numerical data. The function setting button group 132 is used to set the registration of an abridgment dial and conference call. The suspension button 133 is used to set the on and off state of a suspension circuit for setting a call to the suspension state. The response button 134 is used to set the on and off state of a response circuit for responding to the arrived call. The monitor button 135 is used for switching between an outside speaker (not shown) and the handset 121.

The operation of the conventional multifunction telephone switching system will be described with reference to FIGS. 1 and 2.

The control unit 104 monitors the arrival of a call to the multifunction telephone 105 via an external line. The call arrives at the control unit 104 from the public line network 101 via the external line, the private branch exchange 102 and the line unit 103. The line switching control section 112 recognizes the arrival of the external line call to the multifunction telephone 105 through the line control section 111. The line switching control section 112 refers to the data storage section 114 to confirm the on-hook of the multifunction telephone 105. The confirmation of the on-hook is realized by monitoring the status of the handset 121 and the response button 134.

When the line switching control section 112 detects the on-hook state of the multifunction telephone 105, the line switching control section 112 instructs the multifunction telephone control section 113 to carry out a call arriving process. In response to the instruction, the multifunction telephone control section 113 notifies the arrival of the external line call to the multifunction telephone 105. When the multifunction telephone control section 113 detects the off-hook state of the multifunction telephone 105, the multifunction telephone control section 113 notifies the detection result to the line switching control section 112. The line switching control section 112 carries out a channel establishing operation for the multifunction telephone 105. The line switching control section 112 records the off-hook state of the multifunction telephone 105 on the data storage section 114. The line switching control section 112 outputs an originator number to the multifunction telephone 105 when detecting a notice with the originator number. The display unit 122 of the multifunction telephone 105 displays the originator number.

When the multifunction telephone 105 carries out a communication suspending operation, the line switching control section 112 instructs the line control section 111 to carry out a suspension setting operation. The line control section 111 reads a suspension sound from the sound source 115 and notifies to the line unit 103. The suspension sound is notified to the public line network through the private branch exchange 102. The suspension sound is notified to an originator terminal.

The above multifunction telephone switching system is a system which uses a wired telephone network. A portable phone is used for the communication during movement. The portable phone uses a radiophone network. There are two radiophone networks: one is called PDC (Personal Digital Cellular telecommunication system) or PHS (Personal handy-phone System) in the radiophone network. The communication protocol for the multifunction telephone is different from the communication protocol for the portable phone. The portable phone cannot be connected to the multifunction telephone. The communication with the portable phone cannot be carried out via the radio telephone network and the multifunction telephone. The user who uses the portable phone and the multifunction telephone must monitor the arrival of a call to the portable phone and the arrival of a call to the multifunction telephone separately. Also, the user must response the call arrival to the portable phone and the call arrival to the multifunction telephone separately.

In conjunction with the above description, a digital multifunction telephone in an office switching system is disclosed in Japanese Laid Open Patent Application (JP-A-Heisei 10-191420). In this reference, a channel control unit (102) controls a channel which is composed of a hand set (104), a microphone (105), and a speaker (106). A private base station function section (109) has a radio interface function, a modem function and a channel CODEC function with a terminal in a simple type portable phone system which is based on the second generation cordless telephone system standards. A multiplexing and demultiplexing section (110) multiplexes and demultiplexes speech data of the digital multifunction telephone and speech data of the private base station function section 109 into and from the speech channel of the ISDN. A line interface section 103 connects data multiplexed and demultiplexed by the multiplexing and demultiplexing section with the private switching apparatus through the ISDN transmission path.

Also, a private exchange system is disclosed in Japanese Laid Open Patent Application (JP-A-Heisei 10-155167). In this reference, a cooperation managing section (13) manages which of personal computers (31 to 33) cooperates with a PHS mobile terminal (40). A general service executing section (12) refers to the cooperation managing section (13) to determine which of the personal computers (31 to 33) cooperates with the PHS mobile terminal (40), when a call is arrived at the PHS mobile terminal (40). The general service executing section (12) outputs the call arrival data to a high level service executing section (11) when either of the personal computers (31 to 33) cooperates with the PHS mobile terminal (40). The high level service executing section (11) executes a service provided from a multifunction telephone based on the call arrival data, and notifies the data to an API control section (14). The API control section (14) controls the display in accordance with the service in the personal computer (31 to 33) based on the data.

Also, an electronic switching system is disclosed in Japanese Laid Open Patent Application (JP-A-Heisei 11-136714). In this reference, a standard telephone 33 and a PHS terminal (32) are controlled by a digital switching apparatus (10) in cooperation with computers (34 and 35), respectively. In this case, a GUI operation screen which contains a function button corresponding to the digital multifunction telephone is displayed on the personal computers (34 and 35) under the control of computer programs executed there. On this GUI operation screen is displayed a connection state of each of the telephone numbers which have been allocated to the standard telephone (33) or the PHS terminal (32). Also, call control of the standard telephone (33) or the PHS terminal (32) in accordance with the operation on the operation screen. It is possible for a multi-appearance service which is provided only for the digital multifunction telephone to be provided for usual communication terminals such as the standard telephone and the PHS telephone.

Also, a radiophone system is disclosed in Japanese Patent No. 2776066. In this reference, the radiophone system is composed of a switching control unit connected with a telephone network, a wire telephone connected with the switching control system via a wired communication line, a main telephone connected with the switching control system via a wired communication line, and having a multifunction telephone function of the arrival or origination of a call, the communication or the suspension at least, and a plurality of radiophones connected with the main telephone via radio communication lines. The switching control unit includes means for receiving the telephone number of the main telephone and addition information following the telephone number which have been inputted from the wired telephone, and sending out a control signal to the main telephone. The main telephone includes means for determining the existence or non-existence of the addition information following a call arrival command which is contained in the control signal, and carrying out a call arrival start to the radiophone which corresponds to the addition information, when the addition information is consistent with previously stored addition information.

SUMMARY OF THE INVENTION

Therefore, an object of the present invention is to provide a multifunction telephone which can process a call to a portable phone, and a multifunction telephone system.

In order to achieve an aspect of the present invention, a multifunction telephone switching system includes a portable radiophone, a plurality of multifunction telephones, a specific one of which is connected to the portable radiophone, and a control unit connected to the plurality of multifunction telephones to manage the plurality of multifunction telephones. The specific multifunction telephone notifies a call arrival at the portable radiophone to the control unit. The control unit permits response to an arrived call for the specific multifunction telephone based on an operation state of the specific multifunction telephone. The specific multifunction telephone responds to the arrived call at the portable radiophone in response to the permission.

Here, the control unit may set the specific multifunction telephone to a busy state, after has permitted the response.

Also, the control unit may select another of the plurality of multifunction telephones other than the specific multifunction telephone based on the operation states of the plurality of multifunction telephones, when the multifunction telephone cannot respond the arrived call, and permit the response to the arrived call to the another multifunction telephone. At that time, the another multifunction telephone responds to the arrived call at the portable radiophone in response to the permission. In this case, the control unit may determine that the specific multifunction telephone cannot respond the arrived call, when the operation state of the specific multifunction telephone is busy. Also, the control unit may determine that the specific multifunction telephone cannot respond the arrived call, when the specific multifunction telephone has no handset and a set of a speaker and a microphone.

Also, the control unit may include a data storage which stores operation data indicative of the operation state of each of the plurality of multifunction telephones, and refer to the data storage to determine whether each of the plurality of multifunction telephones.

Also, the specific multifunction telephone can respond to the arrived call at the portable radiophone without waiting for the permission when the permission is previously given.

Also, the specific multifunction telephone may notify a line disconnection to the control unit when communication through the portable radiophone is ended. At that time, the control unit sets the specific multifunction telephone to a vacant state.

Also, the specific multifunction telephone may communicate with any of the plurality of multifunction telephones by use of the control unit.

Also, the specific multifunction telephone may originate a dial data including a dial number of a destination radiophone, and notify the origination of the dial data to the control unit. The control unit sets the specific multifunction telephone to a busy state. Thus, the portable radiophone originates a call to the destination radiophone based on the dial data.

Also, when one of the plurality of multifunction telephone sends a dial data including a dial number of a destination radiophone to control unit, the control unit may set the one multifunction telephone to a busy state, and send the dial data to the portable radiophone via the specific multifunction telephone. At that time, the portable radiophone originates a call to the destination radiophone based on the dial data.

In order to achieve another aspect of the present invention, a multifunction telephone includes a handset, a connection control section to which a portable radiophone is to be connected, and a communication control section for controlling a wired line communication and a radio channel communication through the connection control section and the portable radiophone. The communication control section detects a call arrival at the portable radiophone through the connection control section, and responds to an arrived call at the portable radiophone through the connection control section when the response to the arrived call is permitted.

Here, the communication control section can respond to the arrived call at the portable radiophone through the connection control section without waiting for the permission when the permission is previously given.

Also, the communication control section may receive the call arrival at the portable radiophone, and respond to an arrived call at the portable radiophone through the connection control section when the response to the arrived call is permitted.

Also, the communication control section may output an operation state of the multifunction telephone when the operation state is changed.

Also, the communication control section may output a line disconnection when communication through the connection control section and the portable radiophone is ended.

Also, the communication control section may carry out an extension line communication with another multifunction telephone.

Also, the communication control section may originate a dial data including a dial number of a destination radiophone through the connection control section, such that the portable radiophone originates a call to the destination radiophone based on the dial data.

Also, the communication control section may receive a dial data including a dial number of a destination radiophone and send the dial data through the connection control section, such that the portable radiophone originates a call to the destination radiophone based on the dial data.

DESCRIPTION OF THE PREFERRED EMBODIMENTS

Hereinafter, a multifunction telephone switching system using a multifunction telephone of the present invention will be described below in detail with reference to the attached drawings.

Figure 3:
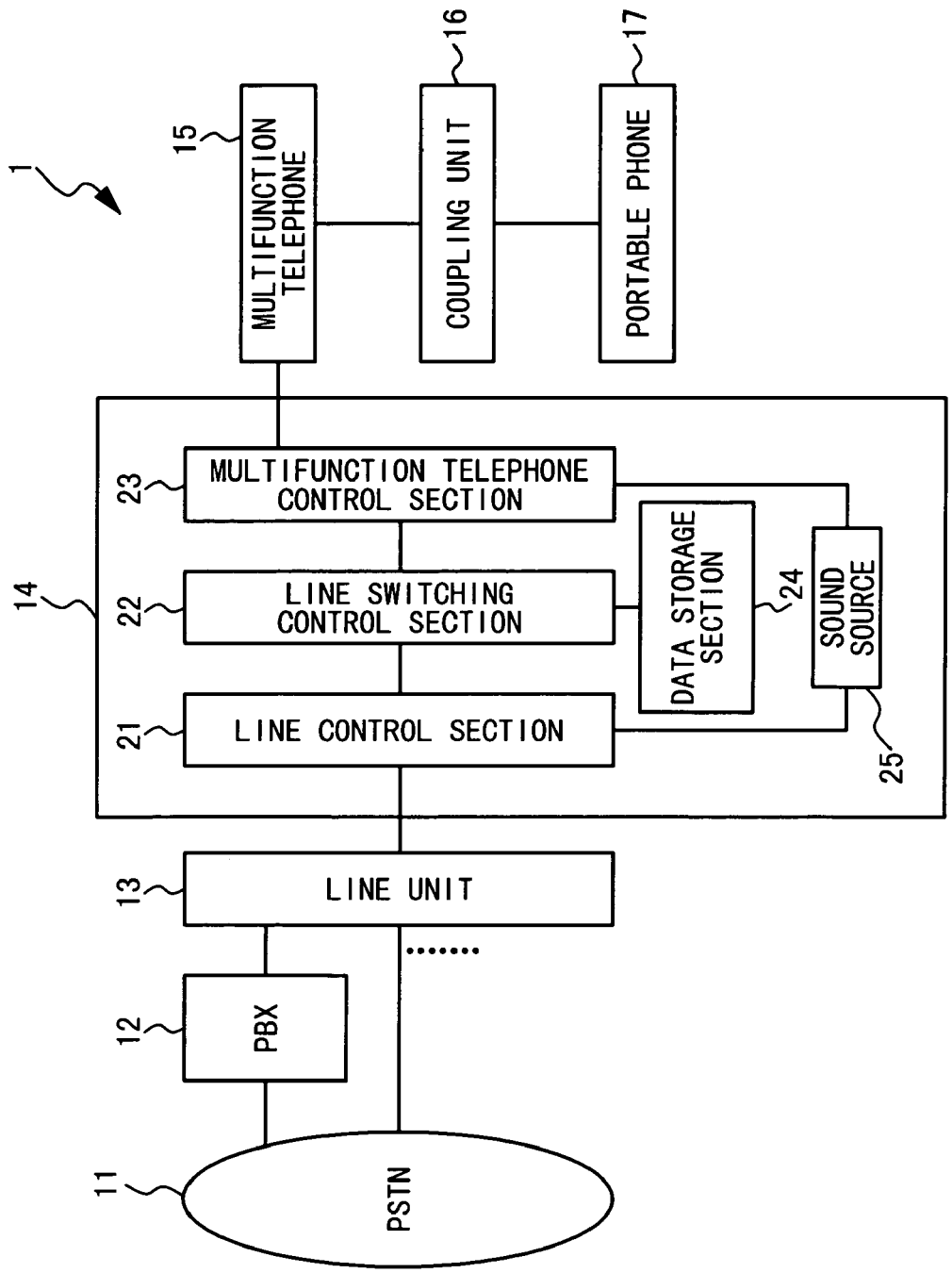
FIG. 3 is a block diagram showing the structure of a multifunction telephone switching system of the present invention.

FIG. 3 shows the structure of a multifunction telephone switching system according to the first embodiment of the present invention. Referring to FIG. 3, the multifunction telephone switching system 1 is composed of a public line network (PSTN) 11, a private branch exchange (PBX) 12, a line unit 13, a control unit 14, a multifunction telephone 15, a coupling unit 16 and a portable phone 17.

The private branch exchange 12 is connected with the public line network 11. The line unit 13 is connected with the private branch exchange 12 and the public line network 11. The private branch exchange 12 may be connected to a plurality of multifunction telephones (not shown) in addition to the public line network 11 and the line unit 13. The line unit 13 carries out the protocol conversion of a signal which is transferred between the private branch exchange 12 or the public line network 11 and the control unit 14. The line unit 13 is a control unit which is composed in software and hardware. The protocol conversion carried out by the line unit 13 is voltage conversion and/or format conversion of the signal.

The control unit 14 is connected with the line unit 13. The multifunction telephone 15 is connected with the control unit 14. The coupling unit 16 is connected with the multifunction telephones 15. The portable telephone 17 is connected with the connection unit 16. The control unit 14 is an exchange unit or a switching unit which accommodates the multifunction telephones of a predetermined number. The control unit 14 is composed in software and hardware. The control unit 14 is installed for every building in a factory site or for every floor of the building.

The control unit 14 is composed of a line control section 21, a line switching control section 22, a multifunction telephone control section 23, a data storage section 24, and a sound source 25. The line control section 21 is connected with the line unit 13. The line control section 21 is connected with the line switching control section 22 and the sound source 25. The line switching control section 22 is connected with the multifunction telephone control section 23 and the data storage section 24. The multifunction telephone control section 23 is connected with the sound source 25. The data storage section 24 is connected with the line switching control section 22.

The line control section 21 carries out the protocol conversion of a signal which is transferred between the line switching control section 22 and the line unit 13. The line control section 21 is composed in software and hardware. The line switching control section 22 carries out the operation control of the plurality of multifunction telephones 15 which are accommodated in the control unit 14. The line switching control section 22 is composed in software and hardware. The multifunction telephone control section 23 carries out the protocol conversion of a signal which is transferred between the line switching control section 22 and the multifunction telephone 15. The multifunction telephone control section 23 is composed in software and hardware. The protocol conversion carried out by the multifunction telephone control section 23 is voltage conversion and/or format conversion of the signal.

The data storage section 24 stores the operation data showing the operation state of each of the plurality of the multifunction telephones 15 which are accommodated in the control unit 14. The data storage section 24 is composed of a rewritable non-volatile memory or a hard desk apparatus. The sound source 25 generates an acoustic signal of an equipment (not shown) which is connected through the line unit 13 or a warning sound and a suspension sound to be reproduced by the multifunction telephone 15. The sound source 25 is composed in software and hardware.

The multifunction telephone 15 carries out an extension line communication with another multifunction telephone. The multifunction telephone 15 carries out an external line communication with the other telephone connected through the public line network 11. The multifunction telephone 15 controls the coupling unit 16 and the portable phone 17 and carries out external line communication with the other telephone connected through a radio channel. The multifunction telephone 15 is composed of a connection connector (not shown) with which the coupling unit 16 is connected. The top outward appearance of the multifunction telephone 15 is identical with the multifunction telephone 105 shown in FIG. 2.

The coupling unit 16 connects the multifunction telephone 15 and the portable phone 17. The coupling unit 16 is composed in software and hardware. The coupling unit 16 carries out the protocol conversion of a signal which is transferred between the multifunction telephone 15 and the portable phone 17. The protocol conversion carried out by coupling unit 16 is voltage conversion and/or format conversion of the signal. The coupling unit 16 has a sound generator (not shown) which generates acoustic signals corresponding to a warning sound and a suspension sound. The portable telephone 17 carries out communication through a radio public line network. The portable telephone 17 is composed of a battery charger and a connection connector (both not shown) with which a handset is connected.

Figure 4:
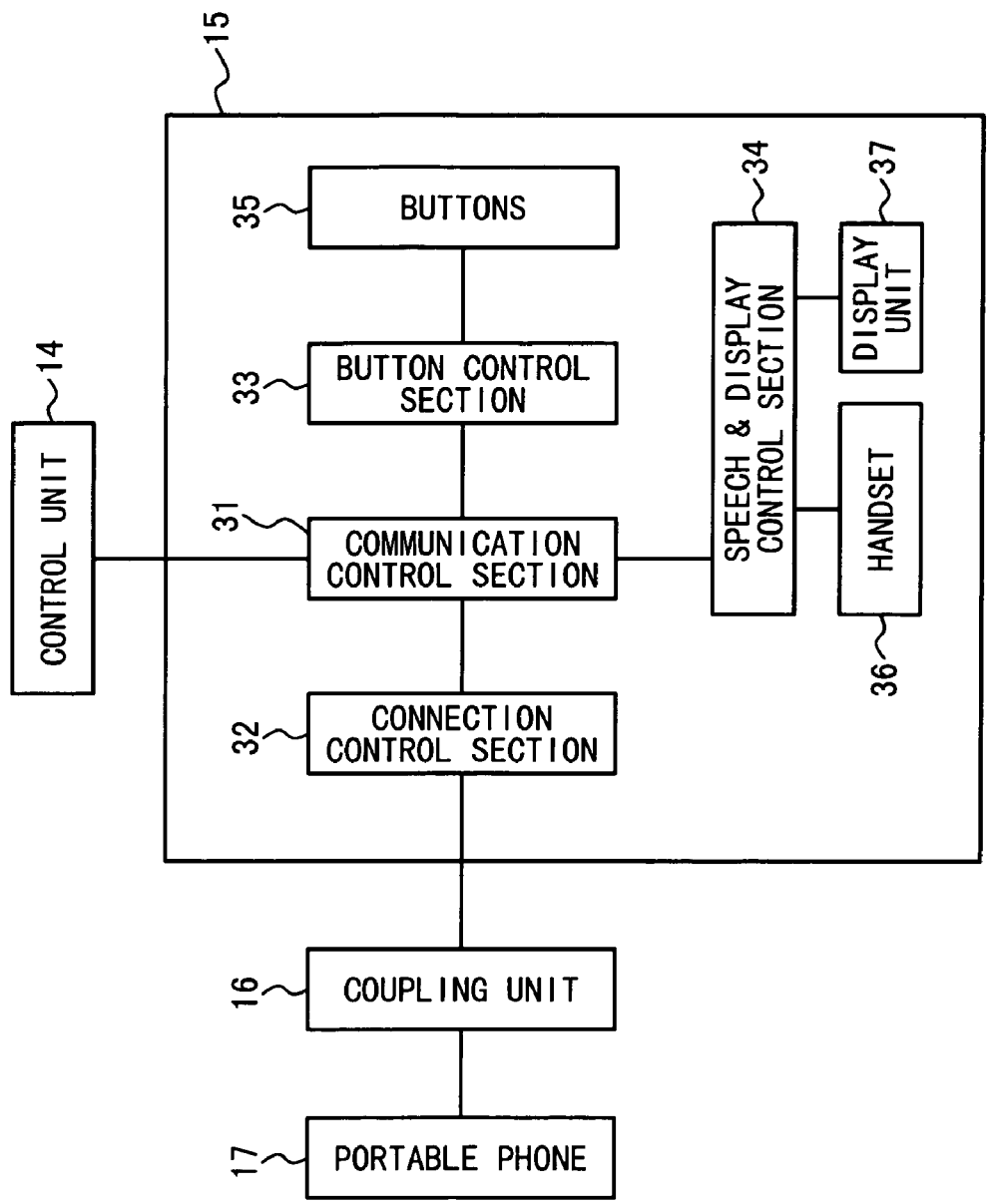
FIG. 4 is a block diagram showing the structure of a multifunction telephone of the present invention.

FIG. 4 shows the structure of the multifunction telephone 15 according to the first embodiment of the present invention. Referring to FIG. 4, the multifunction telephone 15 is composed of a communication control section 31, a connection control section 32, a button control section 33, a speech and display control section 34, buttons 35, a handset 36 and a display unit 37.

The connection control section 32 is connected with the portable phone 17 through the coupling unit 16. The connection control section 32 is connected with the communication control section 31. The communication control section 31 is connected with the control unit 14. The button control section 33 is connected with the communication control section 31. The speech and display control section 34 is connected with the communication control section 31. The buttons 35 are connected with the button control section 33. The handset 36 is connected with the speech and display control section 34. The display unit 37 is connected with the speech and display control section 34.

The connection control section 32 is composed of a connection connector (not shown) with which the coupling unit 16 is connected. The connection control section 32 carries out the protocol conversion of a signal which is transferred between the communication control section 31 and the coupling unit 16. The connection control section 32 is composed in software and hardware. The protocol conversion carried out by the connection control section 32 is voltage conversion and/or format conversion of the signal which is transferred between the communication control section 31 and the coupling unit 16.

The communication control section 31 controls the operation of the multifunction telephone 15. The communication control section 31 is composed in software and hardware. Specifically, the communication control section 31 sends and receives control data to and from the control units 14 based on a button detection operation. The communication control section 31 sends and receives a speech signal to and from the control unit 14 via the coupling unit 16 and the speech and display control section 34. The communication control section 31 carries out the control to transfer a display signal from the control unit 14 to the speech and display control section 34.

The button control section 33 monitors an operation of any of the buttons 35. When the button control section 33 detects the operation of any buttons 35, the button control section 33 notifies the detection result to the communication control section 31. The buttons 35 are composed of a button group 123 shown in FIG. 2 and a control section (not shown). The speech and display control section 34 drives the handset 36 and the display unit 37. The speech and display control section 34 transmits the speech signal outputted from the handset 36 to the communication control section 31. The speech and display control section 34 transmits the speech signal outputted from the communication control section 31 to the handset 36. The speech and display control section 34 transmits a display signal outputted from the communication control section 31 to the display unit 37. The speech and display control section 34 is composed in software and hardware.

The private lines are connected between the line unit 13 and the private branch exchange 12 and between the line unit 13 and the other line unit (not shown). The private lines are composed of wired private lines and radio private lines.

Figure 1:
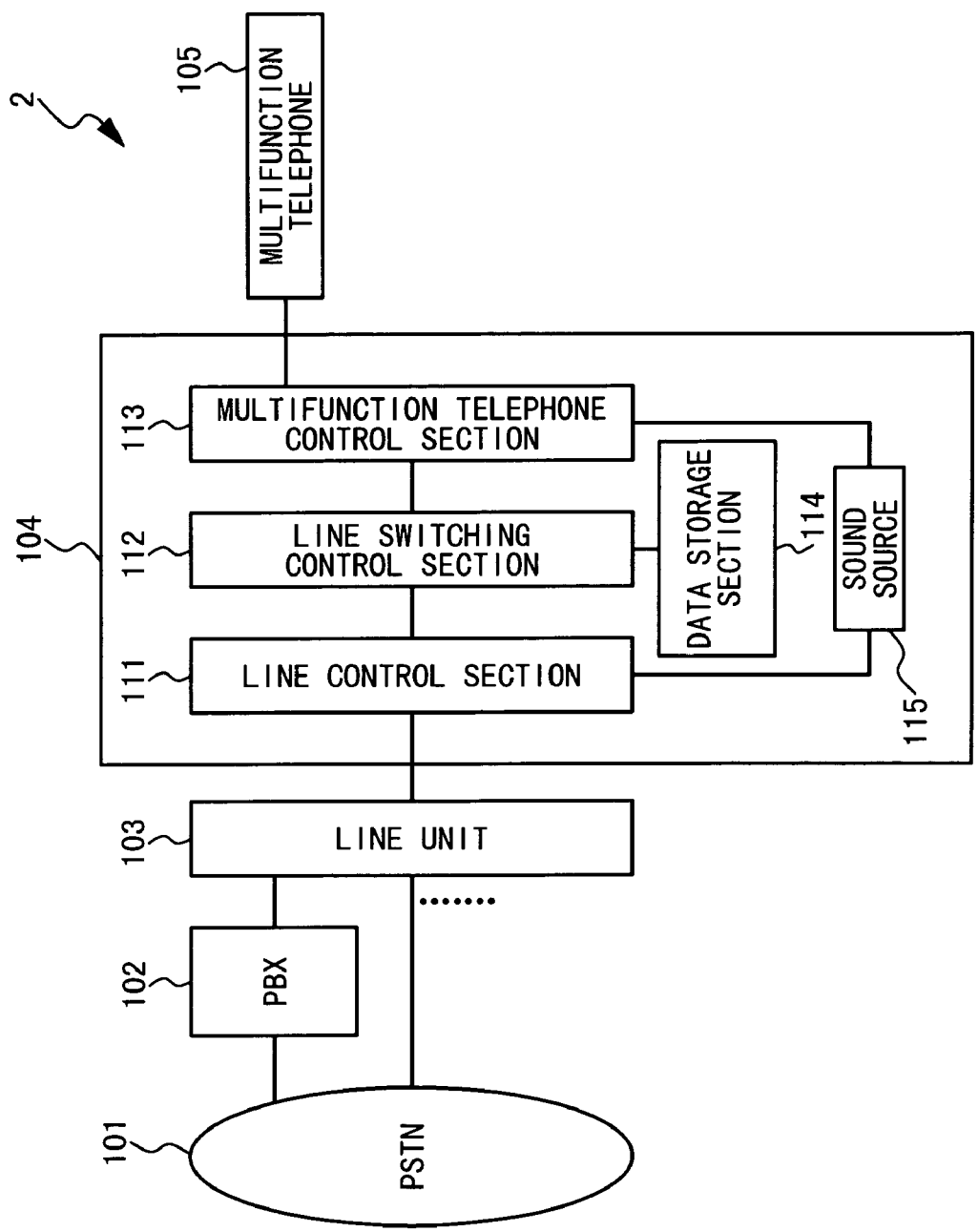
FIG. 1 is a block diagram showing the structure of a conventional multifunction telephone switching system.
Figure 2:
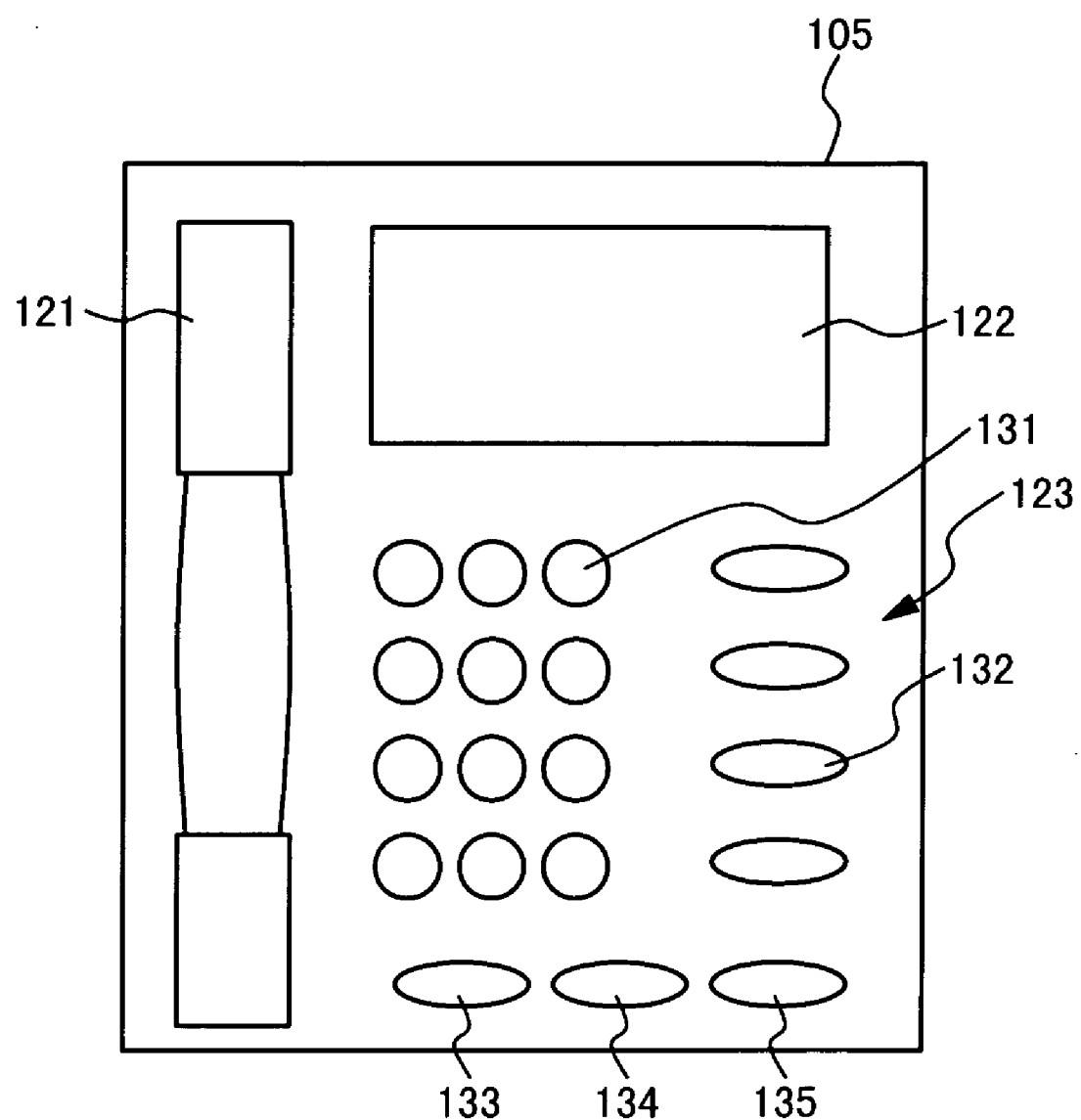
FIG. 2 is a plan showing the top outward appearance of the conventional multifunction telephone.

The handset 36 is such a handset 121 as shown in FIG. 2. The display unit 37 is such a display unit 122 as shown in FIG. 2.

The multifunction telephone 15 according to the first embodiment of the present invention is set to a wired line communication mode when communication is carried out through the public line network 11 or the private line (not shown). The multifunction telephone 15 in the first embodiment is set to a radio line communication mode when communication is carried out through the portable phone 17. The multifunction telephone 15 in the first embodiment can carry out the communication for a call origination which is set to the portable phone 17, through the handset 36.

Figure 5:
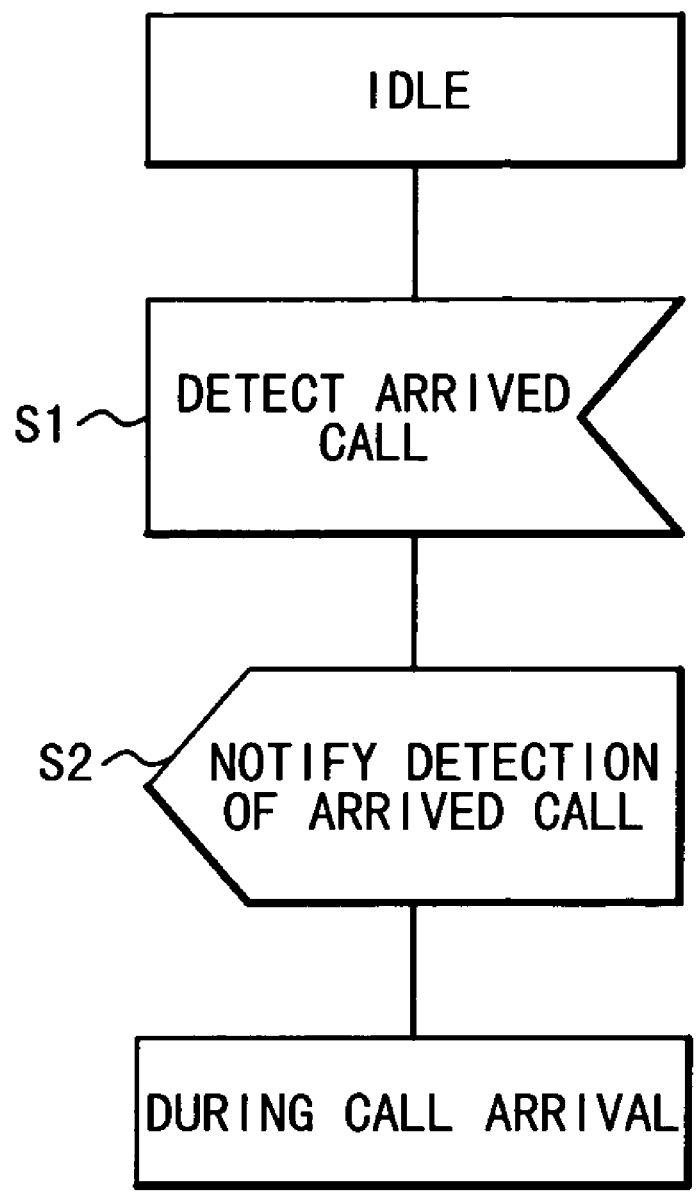
FIG. 5 is a flow chart showing a stand-by operation of the multifunction telephone according to the present invention.

The stand-by operation of the multifunction telephone 15 will be described with reference to FIG. 5.

When a call to the portable phone 17 arrives, a call arrival signal is transmitted to the connection control section 32 through the coupling unit 16. When the connection control section 32 detects the call arrival signal, the connection control section 32 notifies the detection to the communication control section 31. When the communication control section 31 detects the call arrival signal (S1), the communication control section 31 transmits a call arrival notice to the control unit 14 (S2).

The call arrival operation of the multifunction telephone 15 will be described with reference to FIG. 6.

When the control unit 14 receives the call arrival notice, the control unit 14 checks the operation state of the multifunction telephone 15. When the multifunction telephone 15 is in the non-communication state, the control unit 14 transmits a response permission notice to the multifunction telephone 15. The communication control section 31 of the multifunction telephone 15 receives the response permission notice from the control unit 14 (S11), and temporarily stores the state data indicative of permission (S12). The communication control section 31 monitors a pushing operation of a response button 134 (FIG. 2) after execution of the step S12 (S21). The communication control section 31 monitors the off-hook of the handset after execution of the step S12 (S22). The speech and display control section 34 carries out the display of the call arrival on the display unit 37 during execution of the steps S21 and S22. When the communication control section 31 detects the pushing operation of the response button or the off-hook of the handset, the communication control section 31 confirms the state data (S23). The communication control section 31 transmits a response notice to the control unit 14 when the state data indicates the establishment of the response permission (S24). The communication control section 31 waits for a permission in the step S23 in case that the response permission is not established.

In the portable phone 17, when the call arrival stops before the call to the multifunction telephone 15 is established, the connection control section 32 notifies a call arrival stop to the communication control section 31 (S31). The communication control section 31 transmits a call arrival stop notice to the control unit 14 (S32). The communication control section 31 deletes the state data indicative of the establishment of the response permission which has been temporarily stored, and starts the stand-by operation. When the control unit 14 receives the call arrival stop notice as a communication disconnect notice, the control unit 14 monitors a new notice which is transmitted from the multifunction telephone 15.

Figure 7:
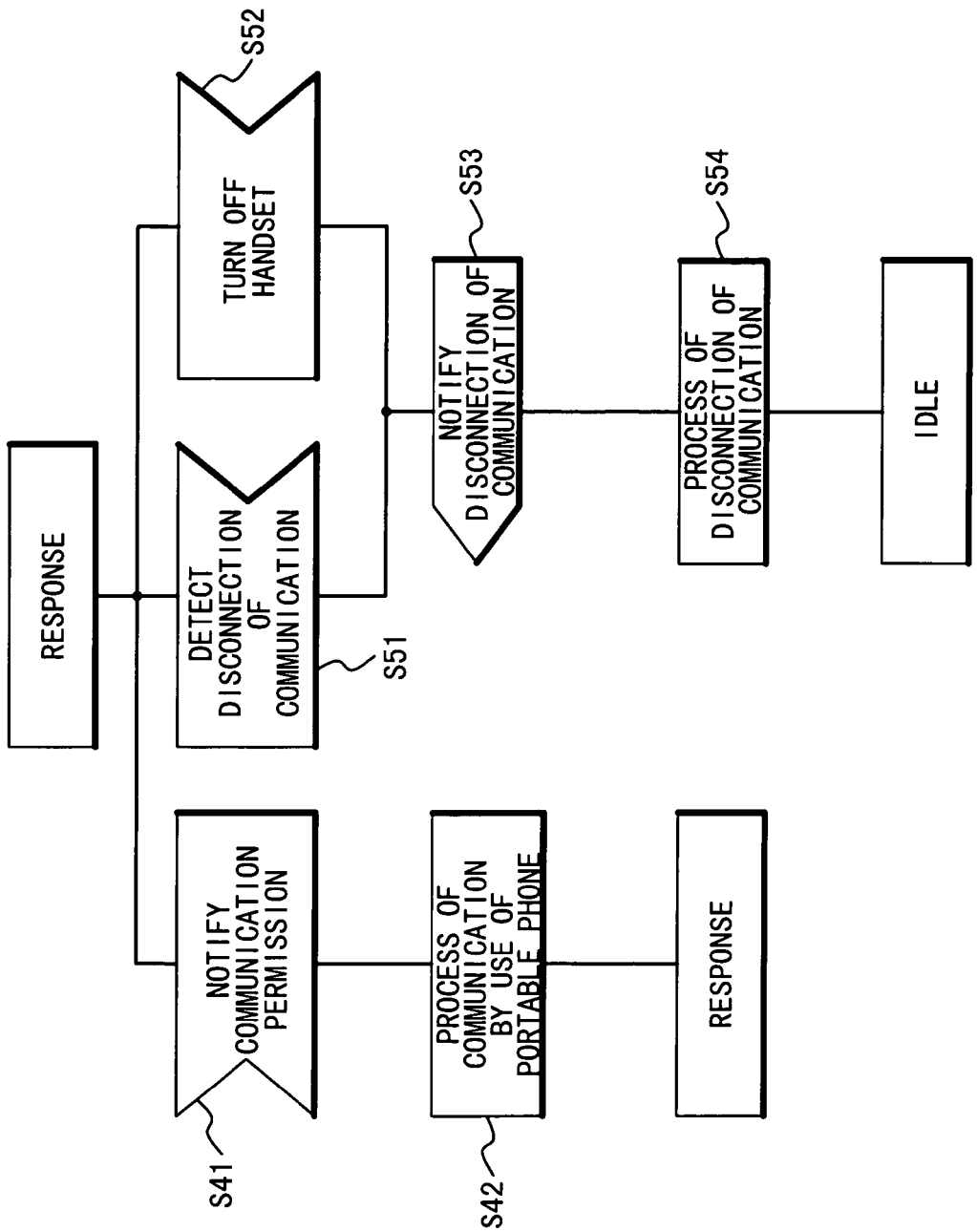
FIG. 7 is a flow chart showing a response operation of the multifunction telephone 15 according to the present invention.

A response operation of the multifunction telephone 15 will be described with reference to FIG. 7.

When the control unit 14 receives the above response notice, the control unit 14 transmits a communication permission notice to the multifunction telephone 15. The communication control section 31 of the multifunction telephone 15 receives the communication permission notice from the control unit 14 (S41). The communication control section 31 transmits a response notice to the portable phone 17 in response to the communication permission notice. The response notice is transmitted to the portable phone 17 through the connection control section 32 and the coupling unit 16. The portable telephone 17 establishes a call when receiving the response notice (S42). The call is connected to the multifunction telephone 15 through the coupling unit 16. The multifunction telephone 15 can carry out communication with the call originator through the portable phone 17.

The communication control section 31 monitors a communication disconnect notice from the portable phone 17 after the call is established (S51). The communication control section 31 monitors a re-pushing operation of the response button and the on-hook (S52). When the communication control section 31 detects the communication disconnect notice, the re-pushing operation of the response button or the on-hook, the communication control section 31 transmits the communication disconnect notice to the control unit 14 (S53). The communication control section 31 deletes the state data indicative of the establishment of the response permission, and starts the of the stand-by operation. When the control unit 14 receives the communication disconnect notice, the control unit 14 monitors a new notice which is transmitted from the multifunction telephone 15.

Figure 8:
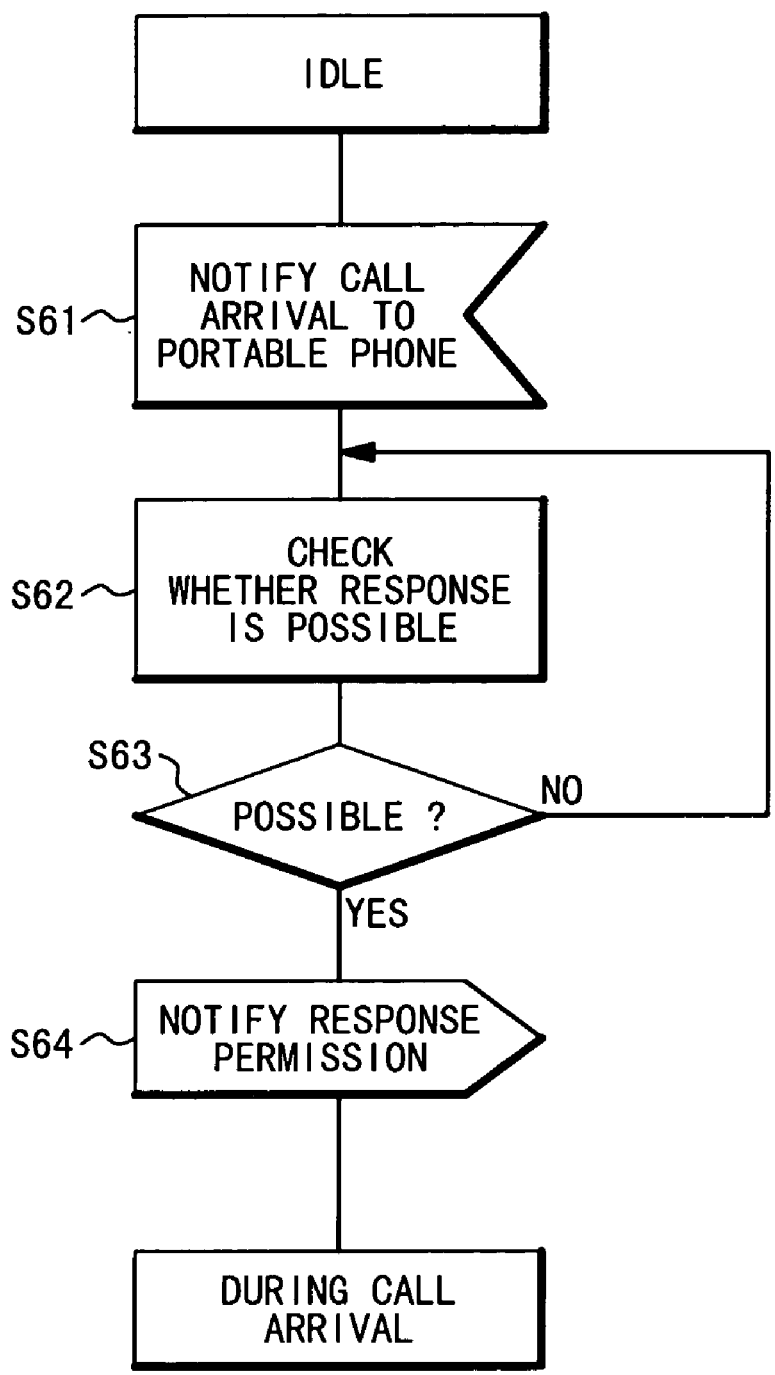
FIG. 8 is a flow chart showing a stand-by operation of a control unit according to the present invention.

The stand-by operation of the control unit 14 of the present invention will be described with reference to FIG. 8.

The call arrival notice (S24 of FIG. 6) transmitted from the multifunction telephone 15 is received by the multifunction telephone control section 23. The multifunction telephone control section 23 transfers the call arrival notice to the line switching control section 22 (S61). The line switching control section 22 reads the operation data of the multifunction telephone 15 from the data storage section 24 (S62), and analyzes the content of the operation data (S63). The line switching control section 22 transmits the response permission notice to the multifunction telephone 15 when the operation data is "Vacancy" indicative of non-communication. When the multifunction telephone 15 receives the response permission notice from the control unit 14, the multifunction telephone 15 carries out the step S11.

Figure 9:
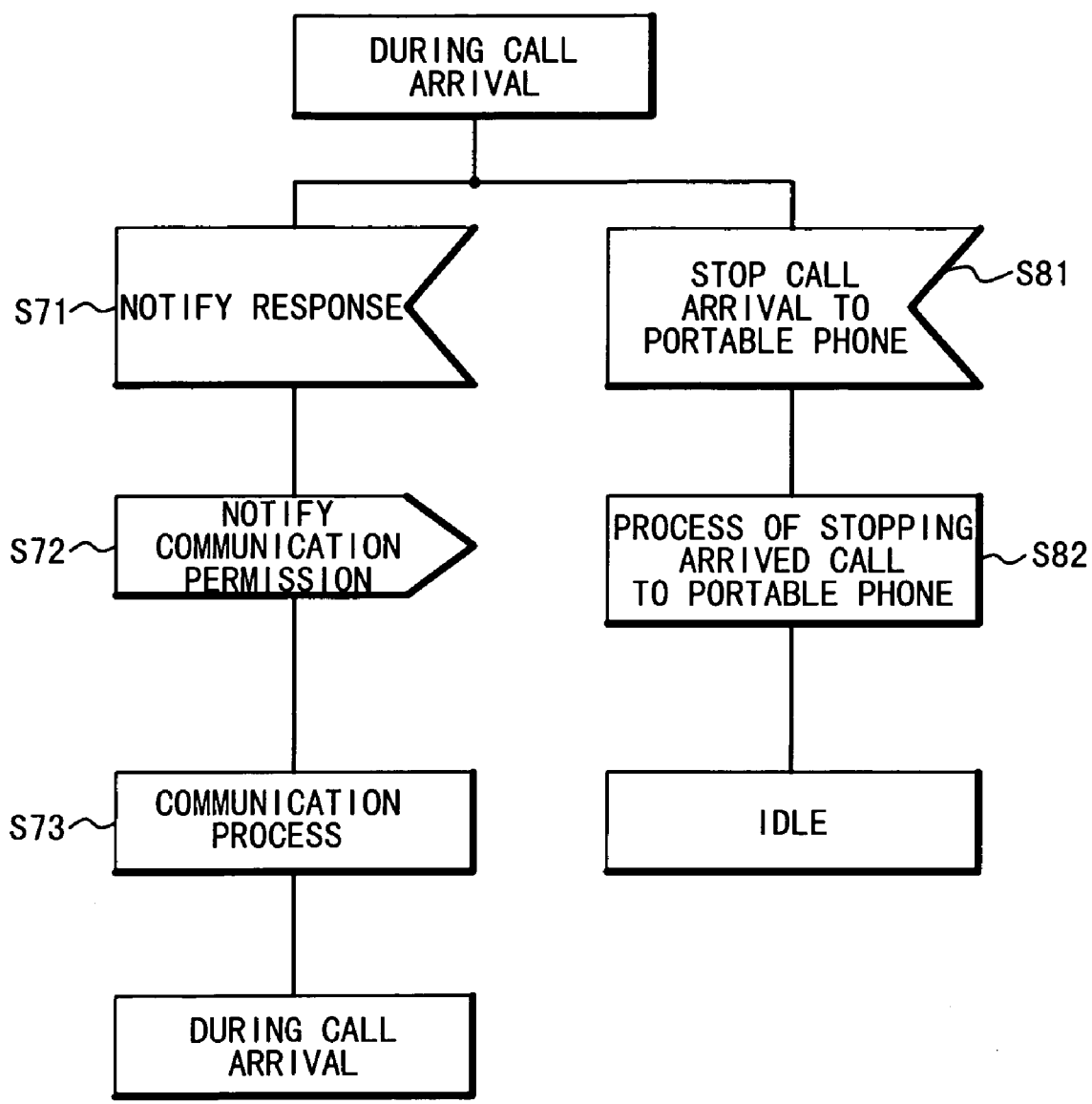
FIG. 9 is a flow chart showing a call arrival operation of the control unit according to the present invention.

The call arrival operation of the control unit 14 of the present invention will be described with reference to FIG. 9.

The response notice (S24 of FIG. 6) transmitted from the multifunction telephone 15 is received by the multifunction telephone control section 23. The multifunction telephone control section 23 transfers the response notice to the line switching control section 22 (S71). The line switching control section 22 changes the content of the operation data of the multifunction telephone 15 into the content of "Busy" indicative of "communicating" to write in the data storage section 24. The line switching control section 22 transmits the communication permission notice (in the step S41 of FIG. 7) to the multifunction telephone 15 (S72). Through this operation, the line switching control section 22 carries out the communication process to monitor the communication end of the multifunction telephone 15 (S73).

The call arrival stop notice transmitted from the multifunction telephone 15 is received by the multifunction telephone control section 23. The multifunction telephone control section 23 transfers the call arrival stop notice to the line switching control section 22 (S81). The line switching control section 22 carries out a call arrival stop process to stop a waiting operation of the response notice which will be transmitted from the multifunction telephone 15 (S82). The line switching control section 22 monitors a new notice which is transmitted from the multifunction telephone 15.

Figure 10:
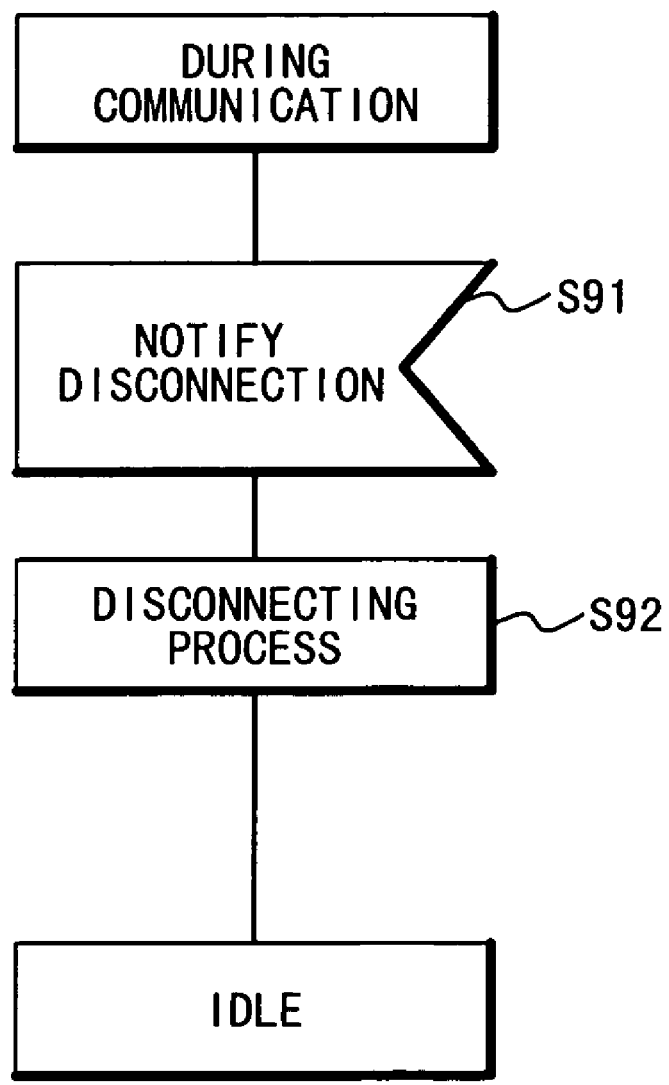
FIG. 10 is a flow chart showing a disconnect operation of the control unit according to the present invention.

The disconnecting operation of the control unit 14 of the present invention will be described with reference to FIG. 10.

Figure 6:
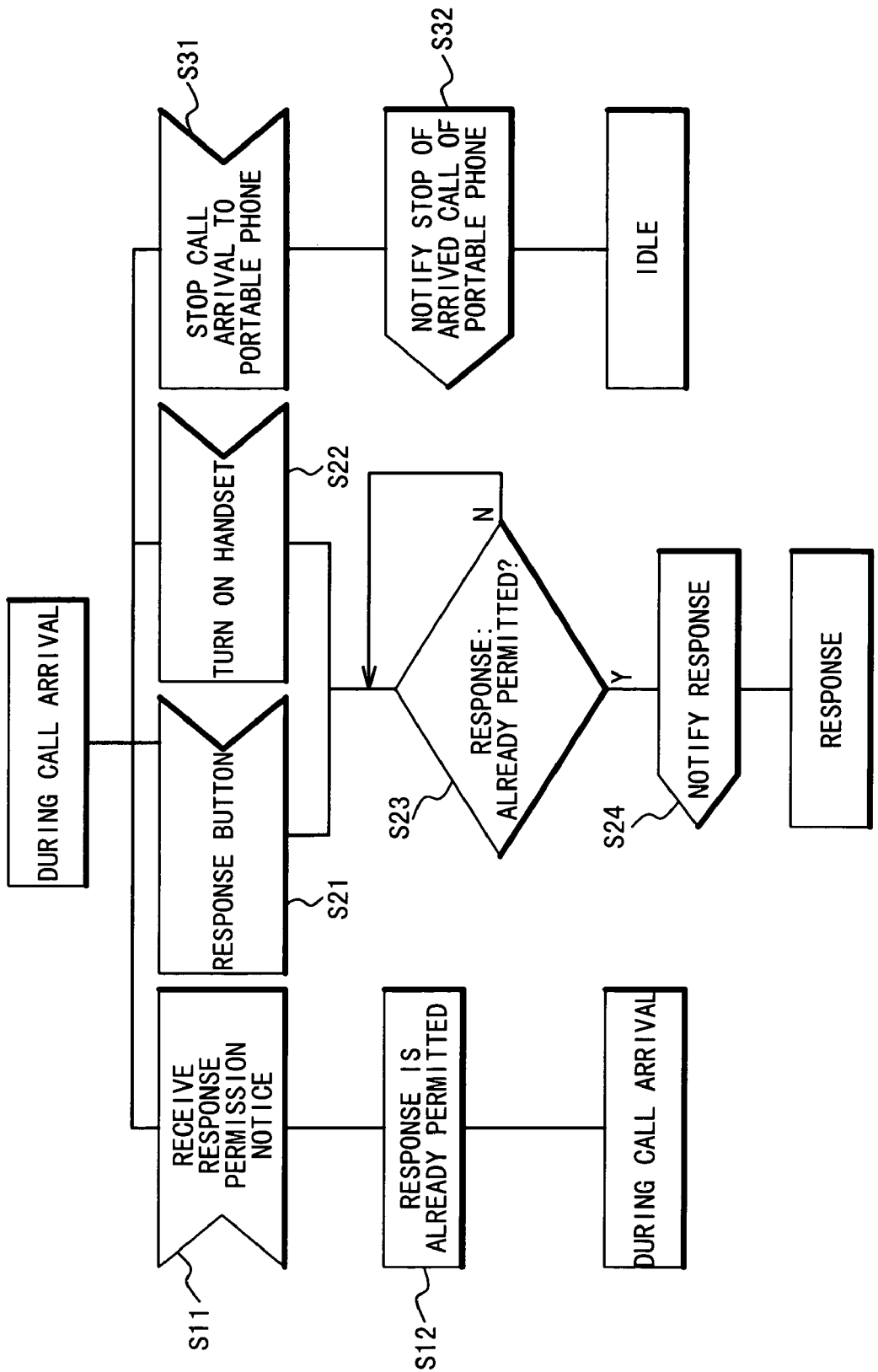
FIG. 6 is a flow chart showing a call arrival operation of the multifunction telephone according to the present invention.

In the step S31 of FIG. 6, the communication disconnect notice transmitted from the multifunction telephone 15 is received by the multifunction telephone control section 23. The multifunction telephone control section 23 transfers the communication disconnect notice to the line switching control section 22 (S91). The line switching control section 22 changes the content of the operation data for the multifunction telephone 15 into the content of "Vacancy" indicative of non-communication to write in the data storage section 24 (S92). The line switching control section 22 monitors a new notice which is transmitted from the multifunction telephone 15.

Figure 11:
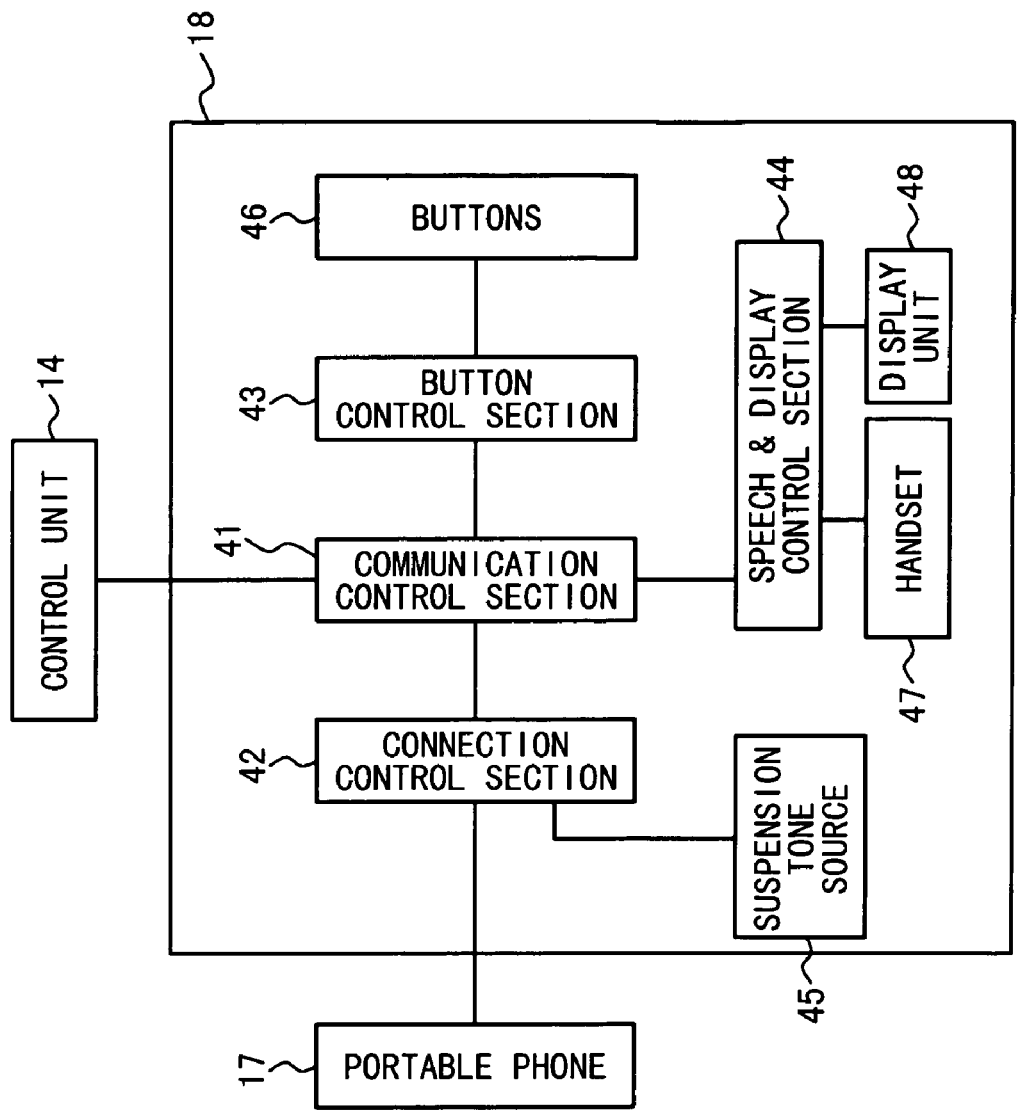
FIG. 11 is a block diagram showing another structure of the multifunction telephone according to the present invention.

FIG. 11 shows the structure of the multifunction telephone 18 according to the second embodiment of the present invention. Referring to FIG. 11, the multifunction portable phone 18 is composed of a communication control section 41, a connection control section 42, a button control section 43, a speech and display control section 44, a suspension sound source 45, buttons 46, a handset 47 and a display unit 48.

The connection control section 42 is connected with the portable phone 17. The connection control section 42 is also connected with the communication control section 41. The communication control section 41 is connected with the control unit 14. The button control section 43 is connected with the communication control section 41. The speech and display control section 44 is connected with the communication control section 41. The buttons 46 are connected with the button control section 43. The handset 47 is connected with the speech and display control section 44. The display unit 48 is connected with the speech and display control section 44. The suspension the sound source 45 is connected with the connection control section 42.

The connection control section 42 is composed of a connection connector (not shown) with which the portable phone 17 is connected. The connection control section 42 is a matching unit which connects the communication control section 41 and the portable phone 17. The connection control section 42 carries out protocol conversion of a signal which is transferred between the communication control section 41 and the portable phone 17. The suspension sound source 45 generates an acoustic signal corresponding to the suspension sound to be reproduced by the portable phone 17. The acoustic signal is transmitted by the portable phone 17 through the connection control section 42. The communication control section 41 is a processor which controls the operation of the multifunction telephone 18. The button control section 43 monitors the operation of any of the buttons 46. When the button control section 43 detects the operation of any of the buttons 46, the button control section 43 notifies a detection content to the communication control section 41. The buttons 46 are composed of a button group 123 shown in FIG. 2. The speech and display control section 44 drives the handset 47 and display unit 48. The speech and display control section 44 connects the handset 47 and the communication control section 41. The speech and display control section 44 transmits a speech signal outputted from the handset 47 to the communication control section 41. The speech and display control section 44 transmits to the handset 47 the speech signal which has been outputted from the communication control section 41. The speech and display control section 44 transmits to the display unit 48 a display signal which is outputted from the communication control section 41.

The handset 46 is composed of a handset 121 shown in FIG. 2. The display unit 48 is composed of a display unit 122 shown in FIG. 2.

The connection control section 42 and the suspension sound source 45 in the multifunction telephone 18 realize the function of the coupling unit 16 and the connection control section 32 which are shown in FIG. 4. The multifunction telephone 18 does not need the coupling unit 16 for connection with the portable phones 17. The portable telephone 17 can be directly connected to the multifunction telephone 18.

Figure 12:
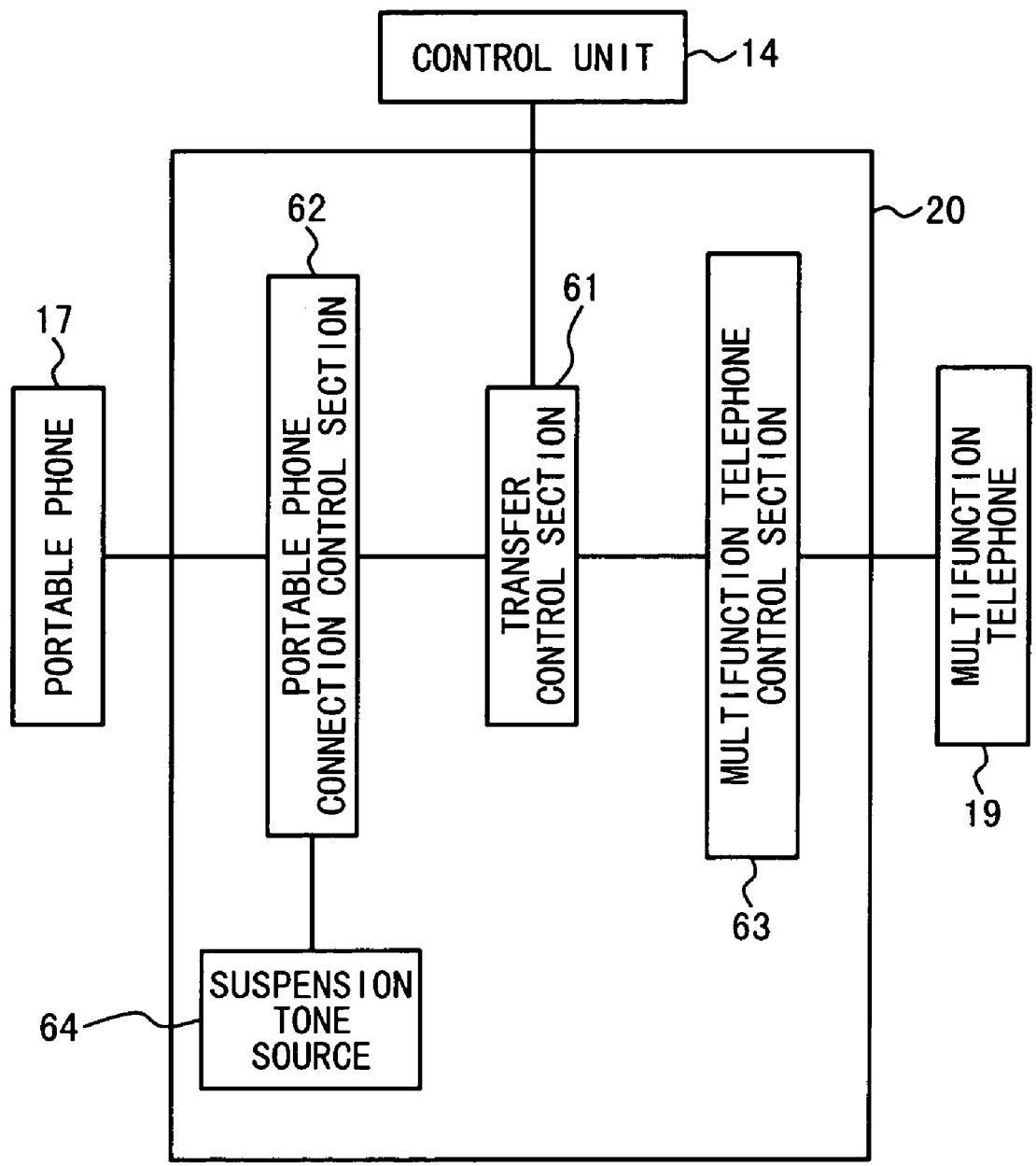
FIG. 12 is a block diagram showing another structure of a connecting unit according to the present invention.

FIG. 12 shows another structure of the connecting unit of the present invention. Referring to FIG. 12, the connecting unit 20 is composed of a transfer control section 61, a portable phone connection control section 62, a multifunction telephone connection control section 63 and a suspension sound source 64.

The portable telephone connection control section 62 is connected with the portable phone 17. The portable telephone connection control section 62 is connected with the transfer control section (communication control section) 61. The multifunction telephone connection control section 63 is connected with the multifunction telephone 19. The multifunction telephone connection control section 63 is connected to the transfer control section 632. The suspension sound source 64 is connected with the portable phone connection control section 62. The transfer control section 61 is connected with the control unit 14.

The control unit 14 can manage the portable phone 17 as one of the telephones which are connected through extension lines. The transfer control section 61 controls the control unit 14 to recognize the portable phone 17.

The transfer control section 61 sets a communication route. The transfer control section 61 is composed in software and hardware. The transfer control section 61 carries out the connection of the multifunction telephone 19 and the control unit 14 (first connection). The transfer control section 61 controls signal transmission between the multifunction telephone 19 and the control unit 14. The first connection is established when the multifunction telephone 19 is used for the external line communication and the extension line communication.

The transfer control section 61 carries out the connection of the multifunction telephone 19 and the portable phone 17 (second connection). The transfer control section 61 controls signal transmission between the multifunction telephone 19 and the portable phone 17. The second connection is established when the external line radio communication which uses the multifunction telephone 19 and the portable phone 17 is carried out.

The transfer control section 61 carries out the connection of the portable phone 17 and the control unit 14 (third connection). The transfer control section 61 controls signal transmission between the portable phone 17 and the control unit 14. The third connection is established when the external line radio communication which another multifunction telephone (not shown) connected to the control unit 14 and the portable phone 17 are used are carried out.

The portable telephone connection control section 62 carries out the protocol conversion of a signal which is transferred between the transfer control section 61 and the portable phone 17. The multifunction telephone connection control section 63 carries out the protocol conversion of a signal which is transferred between the transfer control section 61 and the multifunction telephone 19. The control section is composed of hardware and a program for controlling the hardware. The suspension sound source 64 generates acoustic signals for reproducing a suspension sound and a warning sound. The suspension sound source 64 is composed in software and hardware for speech-synthesizing the sound source data.

The connecting unit 20 can set the multifunction telephone 19 to the non-communication state when transferring the call to the portable phone 17 from the multifunction telephone 19 to another multifunction telephone. The transfer control section 61 carries out the establishment of the second connection when the call to the portable phone 17 is connected with the multifunction telephone 19. The transfer control section 61 detects a pushing operation of the suspension button 133 (FIG. 2). The transfer control section 61 releases the second connection when transferring the call according to the second connection to another the multifunction telephone, and carries out the establishment of the third connection. When connecting the multifunction telephone 19 and the control unit 14 during the establishment of the third connection, the transfer control section 61 carries out the establishment of the first connection. The transfer control section 61 establishes the first connection and third connection at the same time.

The control unit 14 handles the portable phone 17 as one of the multifunction telephones when transferring the call which has been established between the multifunction telephone 19 and the portable phone 17, to the other multifunction telephone. The control unit 14 establishes the call of the extension line communication between the portable phone 17 and the other multifunction telephone, like the extension line transfer process between the multifunction telephones.

The multifunction telephone 18 shown in FIG. 4 can transfer the call to the portable phone 17 to the other the portable phone using an extension line. The communication control section 31, 41 connects the call to the portable phone 17 with the control unit 14. When two lines are established as a communication capacity between the communication control section 31 41 and the control unit 14, the communication control sections 31, 41 can set the multifunction telephone 18 to the non-communication state. That is, the call to the portable phone 17 which is connected with the multifunction telephone 18 and the call to the multifunction telephone 18 (external line communication, extension line communication) can be established at the same time.

It should be noted that when one line is set as the communication capacity between the communication control section 31, 41 and the control unit 14, the communication control section 31, 41 cannot set the multifunction telephone 18 to the non-communication state.

The multifunction telephone 18 of the present invention may be further composed of a power supply unit which supplies the portable phone 17 with the electric power. Instead, the connecting unit 16, 20 of the present invention may be further composed of a power supply unit which supplies the portable phone 17 with the electric power.

The communication control section 31, 41 of the present invention may connect an originated call from the multifunction telephone 19 with the portable phone 17. The communication control section 31, 41 detects a dial data including a dial number outputted from the multifunction telephone 19. The communication control section 31, 41 outputs the dial number to the portable phone 17 when the dial number indicates the originated call from the portable phone 17. The communication control section 31 notifies the operation state of the multifunction telephone 18. The control unit 14 changes the content of the operation data of the multifunction telephone 18 into the content of "Busy" indicative of "calling" to write in the data storage section 24. Also, the communication control section 31, 41 may operates similarly, when the dial data is received from another multifunction telephone via the control unit.

The present invention is not limited to the above embodiments. The present invention can be carried out in various modifications in the range which is not apart from the scope and spirit of the present invention.

In the present invention, a response to the call which arrives to the portable phone is carried out through the multifunction telephone. The present invention can respond to the call of a radio channel through the portable phone and the call of the wired channel using the multifunction telephone. The user of the multifunction telephone does not have to monitor the call arrival to the portable phone and the call arrival to the multifunction telephone. The user of the multifunction telephone is sufficient to monitor the call arrival to the multifunction telephone.

What is claimed is:

1. A multifunction telephone switching system comprising:
    a portable radiophone;
    a plurality of multifunction telephones, a specific one of which is connected to said portable radiophone; and
    a control unit connected to said plurality of multifunction telephones to manage said plurality of multifunction telephones,
    wherein, when said specific multifunction telephone notifies said control unit of a call arrival at said portable radiophone, in response, said control unit switches said same specific multifunction telephone, provided said same specific multifunction telephone is available, from a wired line communication mode to a radio communication mode to answer a call addressed to said portable radiophone via said specific multifunction telephone,
    said control unit permits response to an arrived call for said specific multifunction telephone based on an operation state of said specific multifunction telephone, and
    said specific multifunction telephone responds to said arrived call at said portable radiophone in response to the permission.

2. The multifunction telephone switching system according to claim 1, wherein said control unit sets said specific multifunction telephone to a busy state, after said control unit has permitted said specific multifunction telephone to respond.

3. The multifunction telephone switching system according to claim 1, wherein when said multifunction telephone cannot respond to said arrived call, said control unit selects another multifunction telephone from said plurality of multifunction telephones based on the operation states of said plurality of multifunction telephones, and permits the response to said arrived call to said another multifunction telephone, and
    said another multifunction telephone responds to said arrived call in response to the permission.

4. The multifunction telephone switching system according to claim 3, wherein said control unit determines that said specific multifunction telephone cannot respond said arrived call, when said operation state of said specific multifunction telephone is busy.

5. The multifunction telephone switching system according to claim 3, wherein said control unit determines that said specific multifunction telephone cannot respond to said arrived call, when said specific multifunction telephone lacks at least one of a handset and a set having a speaker and a microphone.

6. The multifunction telephone switching system according to claim 1, wherein said control unit comprises a data storage which stores operation data indicative of said operation state of each of said plurality of multifunction telephones, and refers to said data storage to determine whether each of said plurality of multifunction telephones is occupied.

7. The multifunction telephone switching system according to claim 1, wherein said specific multifunction telephone can respond to said arrived call at said portable radiophone without waiting for the permission when the permission is previously given.

8. The multifunction telephone switching system according to claim 1, wherein said specific multifunction telephone notifies said control unit of a line disconnection when communication through said portable radiophone is ended, and said control unit sets said specific multifunction telephone to a vacant state.

9. The multifunction telephone switching system according to claim 1, wherein said specific multifunction telephone communicates with any of said plurality of multifunction telephones by use of said control unit.

10. The multifunction telephone switching system according to claim 1, wherein said specific multifunction telephone originates a dial data comprising a dial number of a destination radiophone, and notifies the origination of the dial data to said control unit,
    said control unit sets said specific multifunction telephone to a busy state, and said portable radiophone originates a call to said destination radiophone based on said dial data.

11. The multifunction telephone switching system according to claim 1, wherein one of said plurality of multifunction telephone sends a dial data comprising a dial number of a destination radiophone to said control unit,
    said control unit sets said one multifunction telephone to a busy state, and sends the dial data to said portable radiophone via said specific multifunction telephone,
    said portable radiophone originates a call to said destination radiophone based on said dial data.

12. A multifunction telephone comprising:
    a handset;
    a connection control section to which a portable radiophone is to be connected; and
    a communication control section for controlling a wired line communication and a radio channel communication through said connection control section and said portable radiophone,
    wherein said communication control section detects a call arrival at said portable radiophone through said connection control section, and responds to an arrived call at said portable radiophone through said connection control section when the response to said arrived call is permitted,
    wherein said multifunction telephone is managed by a remote control unit, and
    wherein, when said multifunction telephone notifies the remote control unit of an arrived call to said portable radiophone, in response, said remote control unit switches said same multifunction telephone, provided said same multifunction telephone is available, from a wired line communication mode to a radio communication mode to answer a call addressed to said portable radiophone via said multifunction telephone.

13. The multifunction telephone according to claim 12, wherein said communication control section can respond to said arrived call at said portable radiophone through said connection control section without waiting for the permission when the permission is previously given.

14. The multifunction telephone according to claim 12, wherein said communication control section receives said call arrival at said portable radiophone, and responds to an arrived call at said portable radiophone through said connection control section when the response to said arrived call is permitted.

15. The multifunction telephone according to claim 12, wherein said communication control section outputs an operation state of said multifunction telephone when the operation state is changed.

16. The multifunction telephone according to claim 12, wherein said communication control section outputs a line disconnection when communication through said connection control section and said portable radiophone is ended.

17. The multifunction telephone according to claim 12, wherein said communication control section carries out an extension line communication with another multifunction telephone.

18. The multifunction telephone according to claim 12, wherein said communication control section originates a dial data comprising a dial number of a destination radiophone through said connection control section, such that said portable radiophone originates a call to said destination radiophone based on said dial data.

19. The multifunction telephone according to claim 12, wherein said communication control section receives a dial data comprising a dial number of a destination radiophone and sends said dial data through said connection control section, such that said portable radiophone originates a call to said destination radiophone based on said dial data.

20. A telephone switching system comprising:
a portable radiophone receiving calls via radio communication network;
a control unit; and
a plurality of multifunction telephones, at least one of said multifunction telephones comprises:
  a handset;
  a connection control section to which a portable phone is to be connected; and
  a communication control section for controlling a wired line communication and a radio channel communication through said connection control section and said portable phone,
wherein, when said multifunction telephone notifies said control unit of a call arriving to the portable radiophone, in response, said control unit switches said same multifunction telephone, provided said same multifunction telephone is available, from a wired line communication mode to a radio communication mode to answer a call addressed to said portable phone via said handset.

21. The telephone switching system according to claim 20, wherein said communication control section of the multifunction telephone notifies a control unit connected to said multifunctional phone of a call arrival at said portable phone.

22. The telephone switching system according to claim 20, wherein said communication control section of the multifunction telephone detects a call arrival at said portable phone through said connection control section, and responds to the arrived call through said connection control section when the response to said arrived call is permitted.

23. The telephone switching system according to claim 22, wherein said communication control section can respond to said arrived call at said portable phone through said connection control section without waiting for the permission when the permission is previously given.

24. The telephone switching system according to claim 20, wherein said communication control section outputs an operation state of said multifunction telephone when the operation state is changed.

25. The telephone switching system according to claim 22, wherein said plurality of multifunction telephones are private telephones of a private branch exchange network.

26. The telephone switching system according to claim 25, wherein the portable radiophone corresponds with only one multifunction telephone from said plurality of multifunction telephones.

27. The telephone switching system according to claim 26, where said one multifunction telephone further comprises a suspension tone source section for converting the radio signal of a radiophone network into a signal of the wired network, and vise versa.

28. The telephone switching system according to claim 27, wherein said radiophone network is a Personal Digital Cellular telecommunication system or a personal handyphone system.

* * * * *